United States Patent
Tsai et al.

(10) Patent No.: US 8,138,713 B2
(45) Date of Patent: Mar. 20, 2012

(54) ELECTRICAL ENERGY STORAGE DEVICE FOR SOLAR CELL

(75) Inventors: Keh-Chi Tsai, Saratoga, CA (US); Steve James, Big Pine Key, FL (US); Wen-Hua Lin, Yilan County (TW)

(73) Assignees: National Energy Technology Co., Ltd., Taipel County (TW); Apogee Power, Inc., Campbell, CA (US)

( * ) Notice: Subject to any disclaimer, the term of this patent is extended or adjusted under 35 U.S.C. 154(b) by 743 days.

(21) Appl. No.: 12/201,762

(22) Filed: Aug. 29, 2008

(65) Prior Publication Data

US 2010/0052602 A1    Mar. 4, 2010

(51) Int. Cl.
*H01M 10/44* (2006.01)
*H02J 7/00* (2006.01)
*H01M 2/38* (2006.01)
*H01M 6/42* (2006.01)

(52) U.S. Cl. ........ 320/101; 320/138; 320/139; 323/906; 429/454; 429/92; 429/97; 429/100; 429/150

(58) Field of Classification Search ............ 320/101
See application file for complete search history.

(56) References Cited

U.S. PATENT DOCUMENTS

| | | | |
|---|---|---|---|
| 5,811,958 A * | 9/1998 | Yamamoto | 320/101 |
| 6,294,274 B1 * | 9/2001 | Kawazoe et al. | 428/697 |
| 6,380,710 B1 * | 4/2002 | Watanabe et al. | 320/101 |
| 6,429,621 B1 * | 8/2002 | Arai | 320/101 |
| 6,559,620 B2 * | 5/2003 | Zhou et al. | 320/101 |
| 7,078,123 B2 * | 7/2006 | Kazacos et al. | 429/105 |
| 2001/0014420 A1 * | 8/2001 | Takeuchi et al. | 429/209 |
| 2006/0197507 A1 | 9/2006 | Wang | |
| 2008/0141998 A1 | 6/2008 | Sun | |

* cited by examiner

*Primary Examiner* — Yalkew Fantu
(74) *Attorney, Agent, or Firm* — Browdy and Neimark, PLLC

(57) ABSTRACT

An electrical energy storage device for a solar cell includes at least one electrode substrate coated with a oxide or mixed oxides layer. When the electrical energy storage device is electrically connected with a receive unit of the solar unit in parallel, the electrical energy storage device can have the advantages of high electric energy density, enhancing the charging efficiency of the solar cell, and reducing the charging time of the solar cell.

6 Claims, 1 Drawing Sheet

ELECTRICAL ENERGY STORAGE DEVICE FOR SOLAR CELL

BACKGROUND OF THE INVENTION

1. Field of the Invention

The present invention relates generally to an electrical energy storage device, and more specifically to an electrical energy storage device for use in a solar cell.

2. Description of the Related Art

The solar energy is an advanced and sustainable development technology in all kinds of renewable energy technologies, and a solar cell is a device that converts the solar energy into electricity by the photovoltaic effect.

The most common solar cell is the silicon-based solar cell. When the sunlight hits the silicon-based solar panel, the electrons and holes can be generated and allowed to flow through the silicon-based solar panel to produce electricity. However, the photo-electric conversion efficiency of the silicon-based solar cell is determined by the crystal structure. For example, the single-crystal silicon-based solar cell has the photo-electric conversion efficiency of about 14-24%, the polycrystal silicon-based solar cell has the photo-electric conversion efficiency of about 12-20%, and the amorphous silicon-based solar cell has the minimum photo-electric conversion efficiency of 10-14%.

US. Pat. No. 2008/0141998 discloses a solar power system that can change the duty ratio D of the DC/DC converter and measure the voltage variance of the supercapacitor to enhance the efficiency of the solar power system.

Further, US. Pat. No. 2006/0197507 discloses a solar electric power supply device including an ultracapacitor assembly connected to a solar collector unit. The ultracapacitor assembly has ultracapacitors to supply the electric energy converted by the solar collector unit into a storage cell, thereby enhancing the lifetime of the storage cell.

However, the above-mentioned patents only can absorb and convert the light rays with a particular wavelength. For example, the light rays within a wavelength range of 0.2 to 2.4 micrometer can be absorbed by the silicon, but the light rays within other wavelength ranges can't be absorbed or may be converted into heat energy. As a result, the existing solar cell has low photo-electric conversion efficiency and needs to be charged during the sunlit time for providing a long charging time. Even though some solar cells are capable of receiving the light rays within a wide wavelength range, they have the disadvantages of short lifetime, unsustainable use, and high cost.

SUMMARY OF THE INVENTION

The present invention has been accomplished in view of the above-noted circumstances. It is one objective of the present invention to provide an electrical energy storage device for use in a solar cell, which can enhance the charging efficiency of the solar cell.

It is another objective of the present invention to provide an electrical energy storage device for use in a solar cell, which can receive electric currents at different levels to reduce the charging time of the solar cell.

To achieve these objectives of the present invention, the electrical energy storage device comprises at least one electrode substrate coated with a oxide or mixed oxides layer.

Preferably, the electrical energy storage device can provide a pair of the electrode substrates spacedly connected with each other, a separator disposed between the electrode substrates, and an electrolyte contained between said electrode substrates. When the electrical energy storage device is applied to the solar cell, it can be electrically connected with a receive unit of the solar cell in parallel.

As a result, the electrical energy storage device of the present invention has the advantages of high electric energy density, enhancing the charging efficiency of the solar cell, receiving electric currents at different levels, and reducing the charging time of the solar cell.

The scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given herein below and the accompanying drawings which are given by way of illustration only, and thus are not limitative of the present invention, and wherein.

DETAILED DESCRIPTION OF THE INVENTION

Figure 1:
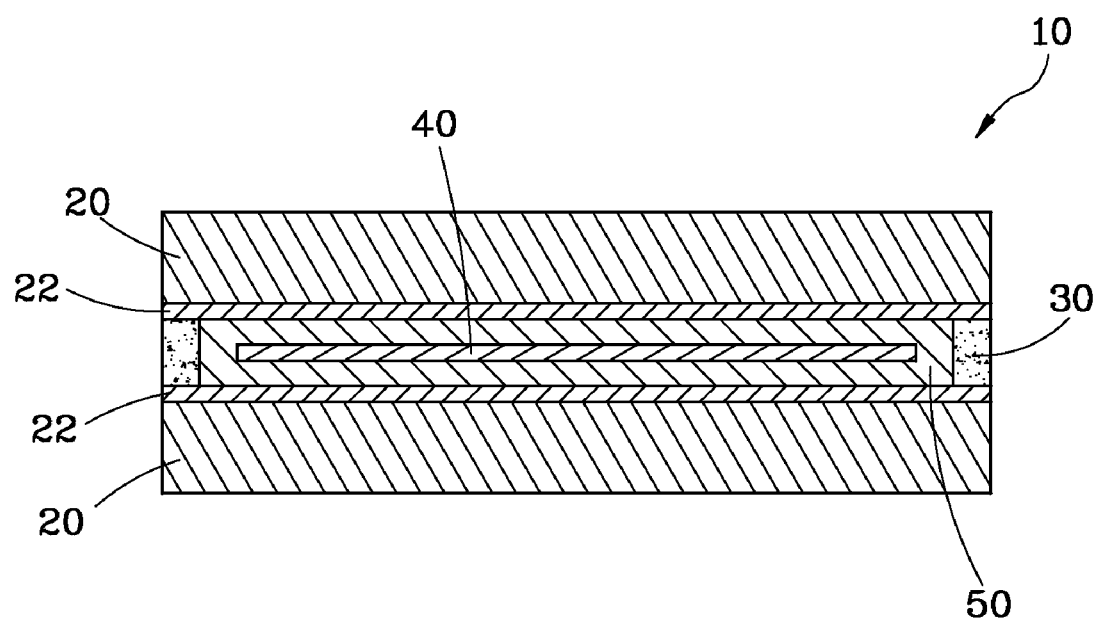
FIG. 1 is a cutaway view of the electrical energy storage device according to a preferred embodiment of the present invention.

As shown in FIG. 1, an electrical energy storage device 10 in accordance with a preferred embodiment of the present invention comprises a pair of electrode substrates 20, each of which is made of titanium and coated with a oxide or mixed oxides layer 22. The oxide layer 22 can be, but not limited to be, coating on each of the electrode substrates 20 by a process for depositing a ceramic coating or by the sol-gel process. The oxide layer 22 includes transition metals, such as platinum, palladium, ruthenium, rhodium or iridium; and further, the oxide layer 22 can include tantalum or zirconium to enhance stabilization.

The electrode substrates 20 are spacedly connected to each other by an insulated annular frame 30. A separator 40 is disposed between the electrode substrate 20 for preventing the electrode substrates 20 from touching each other, and an electrolyte 50, which can be acid solution or alkaline solution, is contained between the electrode substrates 20. By means of the oxide layer 22 and the electrolyte 50, the electrode substrates 20 can attract positive charges and negative charges developing in the electrolyte 50 to storage high electric energy density. After being conducted electricity, the electrical energy storage device 10 has very fast rise time (<5 micro seconds), conductivity greater than $10^5$/ohm-cm, and specific surface area greater than 40 $m^2$/g; moreover, the electrical energy storage device 10 of the present invention not only can be set individually, as shown in FIG. 1, but also can be set plurally to be electrically connected with each other in series, thereby adding functions of the electrical energy storage devices 10.

Figure 2:
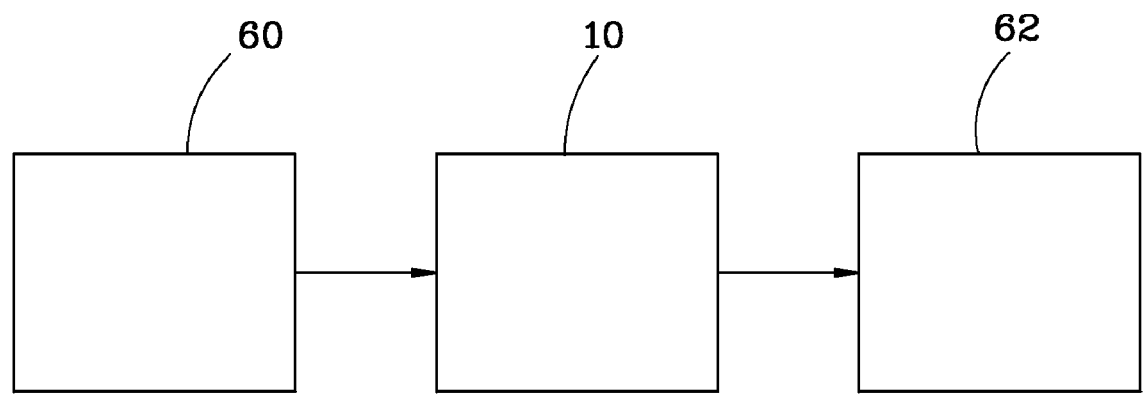
FIG. 2 is a block diagram of the electrical energy storage device, the receive unit, and the battery unit according to the preferred embodiment of the present invention.

When the electrical energy storage device 10 is applied to a solar cell, as shown in FIG. 2, the electrical energy storage device 10 is electrically connected with a receive unit 60 in parallel, and then a battery unit 62 is electrically connected with the electrical energy storage device 10 in parallel. The receive unit 60 can be, but not limited to be, a solar panel, such as a silicon-based solar panel, and the battery unit 62 can be, but not limited to be, a secondary battery, such as a lithium battery.

When the sunlight hits the receive unit 60, the light of different wavelengths will be transformed into electric currents at different levels. Because of the fast rise time, the electrical energy storage device 10 can receive high intensity electrical currents and low intensity electrical currents to charge the battery unit 62. Accordingly, wherever the receive unit 60 is set, such as on a sunny day, a cloudy day, or under the lamplight, the electrical energy storage device 10 is capable of receiving the electrical currents generated from the receive unit 60.

From the results of the experiment, the electrical energy storage device 10 can receive a large number of the electric currents from the receive unit 60 to enable the charging efficiency of the battery unit 62 to be increased about 2.7 times, and the charging time of the battery unit 62 to be shortened.

By means of the aforesaid design, electrical energy storage device 10 of the present invention can achieve the objectives of high electric energy density, enhancing the charging efficiency of the solar cell, receiving the electric currents with different current intensity, and reducing the charging time of the solar cell.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solar cell comprising:
   a receive unit comprising a solar panel;
   an electrical energy storage device electrically connected in parallel with the receive unit; and
   a battery unit electrically connected in parallel with said electrical energy storage device;
   wherein the electrical storage device comprises a pair of electrode substrates (20) spacedly connected to each other by an insulated annular frame (30);
   a solid separator (40) disposed between the electrode substrates (20), preventing the electrode substrates (20) from touching one another;
   electrolyte (50) surrounding the separator (40) and contained between the electrode substrates (20); and
   oxide layers or mixed oxide layers (22) coated on the electrode substrates (20) in contact with the electrolyte (50), the oxide or mixed oxide layers (22) including at least one transition metal selected from the group consisting of platinum, palladium, ruthenium, iridium, rhodium and mixtures thereof.

2. The electrical energy storage device as claimed in claim 1, wherein said electrode substrate is made of titanium.

3. The electrical energy storage device as claimed in claim 2, wherein said electrode substrate is coated with said oxide or mixed oxides layer by a process for depositing a ceramic coating.

4. The electrical energy storage device as claimed in claim 3, wherein said oxide or mixed oxides layer includes tantalum or zirconium.

5. The electrical energy storage device as claimed in claim 1, wherein said electrode substrate is coated with said oxide or mixed oxides layer by a process for depositing a ceramic coating.

6. The electrical energy storage device as claimed in claim 1, wherein said oxide or mixed oxides layer includes tantalum or zirconium.

* * * * *